(12) United States Patent
Bittner

(10) Patent No.: US 8,006,507 B2
(45) Date of Patent: Aug. 30, 2011

(54) SYSTEM AND METHOD FOR SECONDARY COOLANT PUMP CONTROL FOR A REFRIGERATION SYSTEM

(75) Inventor: John D. Bittner, Bethlehem, GA (US)

(73) Assignee: Hill Phoenix, Inc., Conyers, GA (US)

( * ) Notice: Subject to any disclaimer, the term of this patent is extended or adjusted under 35 U.S.C. 154(b) by 428 days.

(21) Appl. No.: 12/367,312

(22) Filed: Feb. 6, 2009

(65) Prior Publication Data

US 2009/0217686 A1    Sep. 3, 2009

Related U.S. Application Data

(60) Provisional application No. 61/032,349, filed on Feb. 28, 2008.

(51) Int. Cl.
*F25D 17/02* (2006.01)
*F25B 49/00* (2006.01)

(52) U.S. Cl. ................ 62/178; 62/185; 62/201

(58) Field of Classification Search .......... 62/177, 62/178, 179, 180, 185, 201
See application file for complete search history.

(56) References Cited

U.S. PATENT DOCUMENTS

| | | | |
|---|---|---|---|
| 7,481,069 B2 | 1/2009 | Lifson et al. | |
| 7,849,701 B2* | 12/2010 | Bittner | 62/185 |
| 2009/0090116 A1* | 4/2009 | Liu | 62/180 |

* cited by examiner

*Primary Examiner* — Marc Norman
(74) *Attorney, Agent, or Firm* — Foley & Lardner LLP

(57) ABSTRACT

A system and method is provided for controlling the operation of secondary coolant pump(s) in a refrigeration system having a secondary coolant system that circulates the coolant to applicable cooling loads, and a primary refrigeration system that chills the coolant in the secondary coolant system. The system and method for controlling the pumps measures the pressure of the plurality of secondary coolant fluid loops, sorts the measurements to identify a secondary coolant fluid loop with a pressure farthest from a setpoint, and adjusts pump speed to compensate for the critical loop (i.e., the secondary coolant fluid loop with a pressure furthest from the setpoint).

21 Claims, 5 Drawing Sheets

SYSTEM AND METHOD FOR SECONDARY COOLANT PUMP CONTROL FOR A REFRIGERATION SYSTEM

CROSS-REFERENCE TO RELATED PATENT APPLICATIONS

This application claims the benefit of U.S. Provisional Application No. 61/032,349, titled "System and Method for Secondary Coolant Pump Control for a Refrigeration System", filed Feb. 28, 2008, which is incorporated herein by reference in its entirety.

BACKGROUND

The present disclosure relates generally to the field of refrigeration systems. More specifically, the disclosure relates to pump control in a refrigeration system. More particularly, the disclosure relates to a system and method for controlling the operation of pumps that circulate a secondary coolant to the temperature controlled storage devices of a refrigeration system.

It is known to provide a refrigeration system including a refrigeration device or temperature controlled storage device such as a refrigerated case, a refrigerator, a freezer, etc. for use in commercial and industrial applications involving the storage and/or display of objects, products and materials. For example, it is known to provide a refrigeration system with one or more refrigerated cases for display and storage of frozen or refrigerated foods in a supermarket to maintain the foods at a suitable temperature (e.g., 32 to 35 degrees F.). In such applications, refrigeration systems often are expected to maintain the temperature of a space within the refrigerated case where the objects are contained within a particular temperature range that is suitable for the particular objects, typically well below the room or ambient air temperature within the supermarket. These refrigeration systems will typically include a heat exchanger in the form of a cooling element or loop within the refrigeration device and provide a flow of a fluid such as a coolant into the cooling element to refrigerate (i.e., remove heat from) the space within the refrigeration device. The refrigeration systems may also include sensors such as thermometers (or thermoswitches) and some type of control system (or timer) configured to provide for the regulation of the target temperature range within the refrigerated case. Various types or configurations of refrigeration systems (e.g., direct expansion system and/or secondary system, etc.) may be used to provide the target temperature range.

In refrigeration systems having a primary loop that circulates a direct expansion type refrigerant that interfaces with, and cools, a liquid coolant in one or more secondary loop(s), the coolant flows through the cooling loops by way of one or more pumps, for example multiple variable speed pumps. The speed of the pump may be adjusted to provide more or less pressure of the coolant in the coolant loops. The adjustment of the pressure of the coolant in the secondary coolant loops as it relates to a hydronic system directly relates to a flow rate adjustment; thus measured pressure within the system is indicative of a required flow rate and hence a cooling requirement. The ability to adjust the flow of coolant to match the cooling requirements of the loads (e.g., temperature controlled cases, etc.) that are connected to each secondary coolant loop is intended to improve management of energy consumption, to obtain improved temperature control in the cases, and to reduce wear on system components. One algorithm for controlling the pump speed is by loop averaging. Loop averaging calculates a mean of measured pressure values from the coolant loops and adjusts the pumps based on the average value.

SUMMARY

One embodiment of the disclosure relates to a secondary coolant refrigeration system. The secondary coolant refrigeration system has one or more pumps configured to pump secondary coolant fluid through one or more secondary coolant fluid loops. At least one of the one or more pumps is a variable speed pump. The secondary coolant refrigeration system also has a controller. The controller is configured to receive loop pressure inputs from pressure sensors associated with each of the plurality of secondary coolant fluid loops via a sensor interface. The controller is further configured to use the received loop pressure inputs to identify a critical loop by determining a secondary coolant fluid loop of the plurality of secondary coolant fluid loops having a loop pressure input furthest from a loop pressure setpoint. The controller is further configured to determine a corrective speed based on the loop pressure input associated with the critical loop and to output a pump speed signal for adjusting a speed of the at least one variable speed pump based on the determined corrective speed.

Another embodiment of the disclosure relates to a method for controlling one or more pumps used in a secondary coolant refrigeration system. At least one of the one or more pumps is a variable speed pump. The secondary coolant refrigeration system includes one or more secondary coolant fluid loops. The method comprises measuring one or more loop pressures in the one or more secondary coolant fluid loops. The method further comprises sorting the loop pressures to identify a loop pressure of the measured loop pressures furthest from a loop pressure setpoint. The method further comprises adjusting the speed of the at least one variable speed pump based on the loop pressure furthest from the loop pressure setpoint.

Another embodiment of the disclosure relates to a controller configured to control one or more pumps. At least one of the one or more pumps is a variable speed pump. The one or more pumps are configured to pump secondary coolant fluid through a plurality of secondary coolant fluid loops. The controller comprises a sorting module. The sorting module is configured to receive loop pressure inputs from pressure sensors associated with the plurality of secondary coolant fluid loops via a sensor interface. The sorting module is further configured to use the received loop pressure inputs to identify a critical loop by determining a secondary coolant fluid loop of the plurality of secondary coolant fluid loops with a loop pressure input furthest from a loop pressure setpoint. The controller further comprises a speed module. The speed module is configured to determine a corrective speed based on the loop pressure input associated with the critical loop and to output a pump speed signal for adjusting a speed of the at least one variable speed pump based on the determined corrective speed.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Figure 1A:
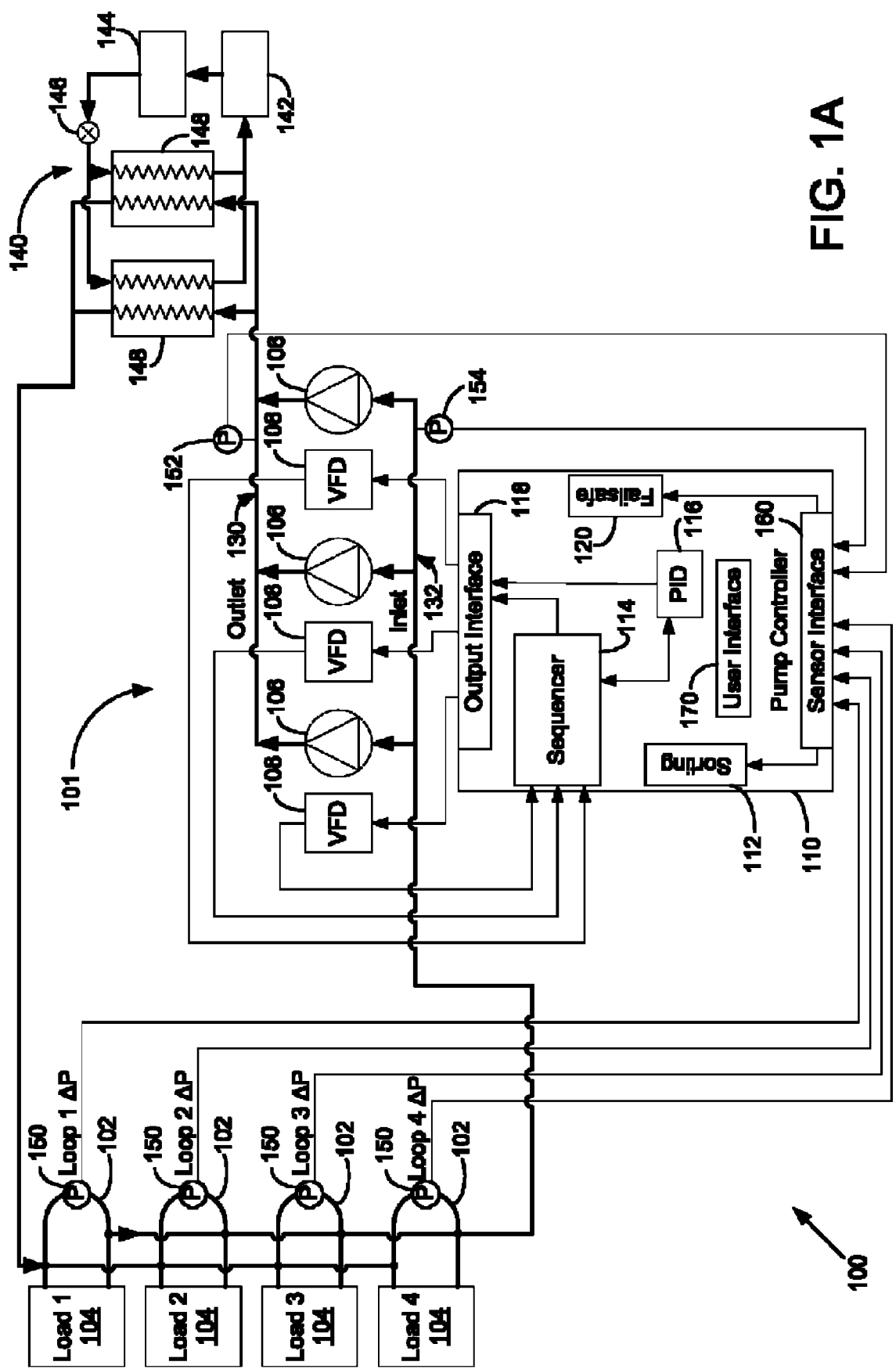
FIG. 1A is a block diagram of a refrigeration system including a pump controller, according to an exemplary embodiment.

Before turning to the figures, which illustrate the exemplary embodiments in detail, it should be understood that the application is not limited to the details or methodology set forth in the following description or illustrated in the figures. It should also be understood that the phraseology and terminology employed herein is for the purpose of description only and should not be regarded as limiting.

According to any preferred embodiment, a system and method is provided for controlling the operation of secondary coolant pump(s) in a refrigeration system having a secondary coolant system that circulates the coolant to applicable cooling loads via a plurality of secondary coolant fluid loops. The system and method for controlling the pumps measures the pressure of the plurality of secondary coolant fluid loops, sorts the measurements to identify a secondary coolant fluid loop with a pressure farthest from a setpoint, and adjusts pump speed and/or sequencing of the pump(s), to compensate for the critical loop (i.e., the secondary coolant fluid loop with a pressure furthest from the setpoint).

Referring to FIG. 1, a block diagram of a refrigeration system 100 is shown, according to an exemplary embodiment. Refrigeration system 100 includes a primary refrigerant system 140 and a secondary cooling system 101 that is configured to provide a cooling and/or heating function to one or more refrigeration loads 104 by controlling coolant flow through one or more secondary coolant fluid loops 102 (e.g., a hydronic loop, a heat exchange loop, etc.—shown for example as four loops) associated with loads 104. Loads 104 may be or include any of a wide variety of objects to be cooled such as temperature controlled storage devices (e.g., refrigerated display cases, walk-in coolers, etc.). Secondary cooling system 101 also includes multiple pumps 106, variable frequency drives (VFDs) 108 associated with pumps 106, and a pump controller 110. Refrigeration system 100 also includes a primary refrigerant loop 140 for circulating a refrigerant (e.g., an expansion type refrigerant, etc.) through a compressor 142 and a condenser 144 and an expansion device 146 to one or more chillers 148 and back to compressor 142. Chillers 148 may be heat exchangers (e.g., plate type heat exchangers or the like) shown to be located "downstream" of secondary coolant pumps 106 and provide an interface between secondary coolant system 101 and the primary loop to provide "chilling" or cooling of the secondary coolant fluid by the refrigerant.

According to one exemplary embodiment, refrigeration system 100 includes a secondary coolant system 101 with a plurality of branches or loops 102, as may be used in refrigeration of loads 104 such as temperature controlled storage devices in facilities such as food retailing outlets (e.g., supermarkets, etc.). According to other exemplary embodiments, refrigeration system 100 may be used with other loads in any commercial, industrial, institutional, or residential application. While FIG. 1 illustrates four loads 104 and a loop 102 associated with each load 104, according to other exemplary embodiments, there may be more or fewer than four loads and/or loops in the system. According to other exemplary embodiments, one loop may be associated with more than one load. According to still other exemplary embodiments, more than one loop may be associated with each load.

Pumps 106 are configured to pump a coolant fluid through loops 102 of secondary coolant system 101 to provide cooling to loads 104. The coolant exits pumps 106 via an outlet or outlet header 130 and returns to pumps 106 via an inlet or inlet header 132. The coolant fluid may be any fluid capable of absorbing, transporting, and/or emitting heat (e.g., glycol, water, etc.). While FIG. 1 illustrates three pumps, according to other exemplary embodiments, more or fewer than three pumps may be used. While each pump 106 may be a variable speed pump, according to other exemplary embodiments, one or more pumps may be fixed speed pumps as long as at least one pump is a variable speed pump. According to some exemplary embodiments, the pumps may be alternating current (AC) electric motor pumps while in other exemplary embodiments the pumps may be direct current (DC) electric motor pumps. In some exemplary embodiments, pumps 106 may be configured such that the lead pump (i.e., the first pump for pump sequencing purposes) is alternated periodically to avoid excessive wear on one pump as compared to the other pumps.

VFD 108 is a circuit configured to control the rotational speed of a pump 106 by controlling the frequency (and thus voltage) of the electrical power supplied to pump 106. While FIG. 1 illustrates a VFD 108 corresponding to each pump 106, according to other exemplary embodiments one VFD may be used to control all the pumps, each pump may be controlled by multiples VFDs, or multiple VFDs may each control multiple pumps. According to various exemplary embodiments, VFD 108 may be a solid state device, for example using a rectifier bridge. According to other exemplary embodiments, VFD 108 may include analog circuitry. According to other exemplary embodiments, VFD 108 may be another type of adjustable speed drive such as a slip controlled drive or any other adjustable or variable speed drive.

Pump controller 110 is generally configured to control the fluid flow of coolant through system 101 based on pressure inputs from loop pressure sensors 150 that take pressure readings at loops 102. Pump controller 110 may control the fluid flow by controlling the speed of each individual pump 106, controlling the sequencing of pumps 106, and/or providing alarm and failsafe functions. According to various exemplary embodiments pump controller 110 may be a digital and/or analog circuit. According to some exemplary embodiments, pump controller 110 may be implemented in part by computer code executed on a processing circuit. According to still other exemplary embodiments, pump controller 110 may be a standalone controller. In the exemplary embodiment shown in FIG. 1, pump controller 110 is shown to include a sorting module 112, a sequencer 114, a proportional-integral-derivative (PID) controller 116, an output interface 118, a failsafe module 120, a sensor interface 160, and a user interface 170.

Sensor interface 160 is configured to receive pressure reading inputs from loop pressure sensors 150, outlet pressure sensor 152, and inlet pressure sensor 154, and communicate those inputs to modules of pump controller 110. In some embodiments, sensor interface 160 may be configured to receive inputs from sensors other than pressure sensors, such as one or more fluid flow sensors located in secondary coolant system 101. In the illustrated embodiment, sensor interface 160 is configured to communicate loop pressure inputs from loop pressure sensors 150 to sorting module 112 and pressure inputs from outlet pressure sensor 152 and inlet pressure sensor 154 to failsafe module 120. In some embodiments, sensor interface 160 may be configured to communicate these and other inputs to any modules of pump controller 110, such as user interface 170 and alarm module 122, described herein with reference to FIG. 2. Sensor interface 160 may be or include any number of jacks, terminals, solder points, filters, and/or other circuitry.

Pump controller 110 includes pressure setpoints that may be used by one or more modules of pump controller 110 to determine a pressure error for each loop 102, where the pressure error is the difference between a pressure input and the setpoint associated with a loop. Pressure setpoints may be based on target temperature ranges or target pressure ranges. In some exemplary embodiments, pressure setpoints may be determined according to hydraulic characteristics of refrigeration system 100. In some exemplary embodiments, pressure setpoints may be the same for all loops. In other exemplary embodiments, pressure setpoints may be different for each loop, or may be the same for some loops and different for others. Setpoints may be used by one or more modules of pump controller 110, such as PID controller 116 and dynamic tuning module 124, described herein with reference to FIGS. 2, 3A and 3B, to perform various calculations related to the operation of pump controller 110. The setpoints may be static setpoints, setpoints received from a memory, and/or adjustable setpoints received from user interface 170.

Sorting module 112 is a circuit configured to sort the inputs received from sensor interface 160 to identify a "critical loop" from loops 102 having the greatest pressure error (i.e., the difference between the pressure input and setpoint associated with the loop). According to an exemplary embodiment, sorting module 112 receives differential pressure inputs and a setpoint related to each loop 102 and identifies the critical loop by comparing all active loops 102 and determining which loop has a differential pressure input that is farthest (i.e., largest magnitude) from the setpoint for the loop. The identified pressure input for the critical loop and setpoint of the critical loop are sent to PID controller 116 and sequencer 114. In some exemplary embodiments, the loop error for the critical loop may be sent to PID controller 116 and sequencer 114 rather than both the pressure input and the setpoint. In yet another embodiments an identifier for the critical loop (e.g., a loop ID) may be provided to the PID controller 116 and/or sequencer 114.

PID controller 116 is a circuit configured to correct the pressure error between the pressure input for the critical loop and setpoint of the critical loop by calculating a corrective speed that is used to adjust the pressure. PID controller 116 uses a PID algorithm to perform a proportional, integral, and derivative PID analysis using PID setpoints, the differential pressure of the critical loop, and the setpoint of the critical loop to determine a corrective speed (e.g., corrective drive speed, corrective pump speed, corrective motor speed, corrective hydraulic speed, etc.) for pump 106. PID controller 116 moves the pressure associated with the critical loop closer to the setpoint and, accordingly, reduces the pressure error for the critical loop.

Sequencer 114 is a circuit configured to provide signals used to turn one or more pumps 106 on or off. Sequencer 114 receives the differential pressure and setpoint associated with the critical loop and one or more VFD 108 pump speed signals. Sequencer 114 compares the differential pressure of the critical loop with the setpoint of the critical loop to determine if a pump 106 is to be sequenced or actuated to an "on" state or "off" state. Sequencer 114 may be configured to sequence a pump 106 to an "on" state if the pressure input for the critical loop is below the setpoint. In some embodiments, sequencer 114 may sequence a pump 106 to an "on" state only if the pressure input for the critical loop is below the setpoint and the pressure error cannot be corrected by changing the speed of the variable speed pump(s) that are already on (i.e., PID controller 116 has applied its full corrective action). If sequencer 114 determines that a pump 106 is to be sequenced on, the sequencer waits for a maximum speed signal from VFD 108 and then outputs an actuation signal to pump 106. Sequencer 114 may be configured to sequence a pump 106 to an "off" state if the pressure input for the critical loop is at or above the setpoint. In some embodiments sequencer 114 may be configured to not sequence a pump 106 to an "off" state if the pressure input for the critical loop is at or above the setpoint if it is more efficient to operate more pumps at a lower speed than sequence one pump off and operate the other pump(s) at a higher speed. If sequencer 114 determines that a pump 106 is to be sequenced off, the sequencer checks the speed signal and waits, allowing the pump speed to fall below a pump off speed. Operation of sequencer 114, according to an exemplary embodiment, shall be described in greater detail with reference to FIG. 4.

Output interface 118 is configured to provide pump sequencing signals (e.g., to turn a pump 106 on or off) and/or pump speed signals to pumps 106. According to one exemplary embodiment, output interface 118 may provide two or more signals on separate lines. According to another exemplary embodiment, output interface 118 may multiplex two or more signals into a single signal. According to another exemplary embodiment, output interface 118 may buffer two or more signals and output the buffered signals simultaneously or in a staggered fashion.

Sensor interface 160 and output interface 118 can be any wired or wireless (e.g., utilizing RF communications, infrared communications, etc.) interfaces. For example, the interfaces can be or include terminals, optical interfaces, electrical connections, plugs, solder points, digital interfaces, analog interfaces, interfaces that allow for easy attachment or detachment, or the like. Each interface can be, include, or be associated with circuitry for receiving and/or interpreting the signals received at each interface. The circuitry can be a part of the interface and/or a part of the pump controller (e.g., mounted to one or more printed circuit boards associated with the pump controller). The circuitry for receiving and/or interpreting can also be at least partially included with a processing circuit of the pump controller. The interfaces can include or be associated with one or more analog-to-digital converters (if receiving an analog signal), digital-to-analog converters (if receiving a digital signal that is to be processed via analog circuitry), circuitry configured to appropriately filter, limit, and/or amplify received signals, or any other circuitry configured to prepare signals received at the interfaces for use by logic circuitry or modules of pump controller 110.

Figure 1B:
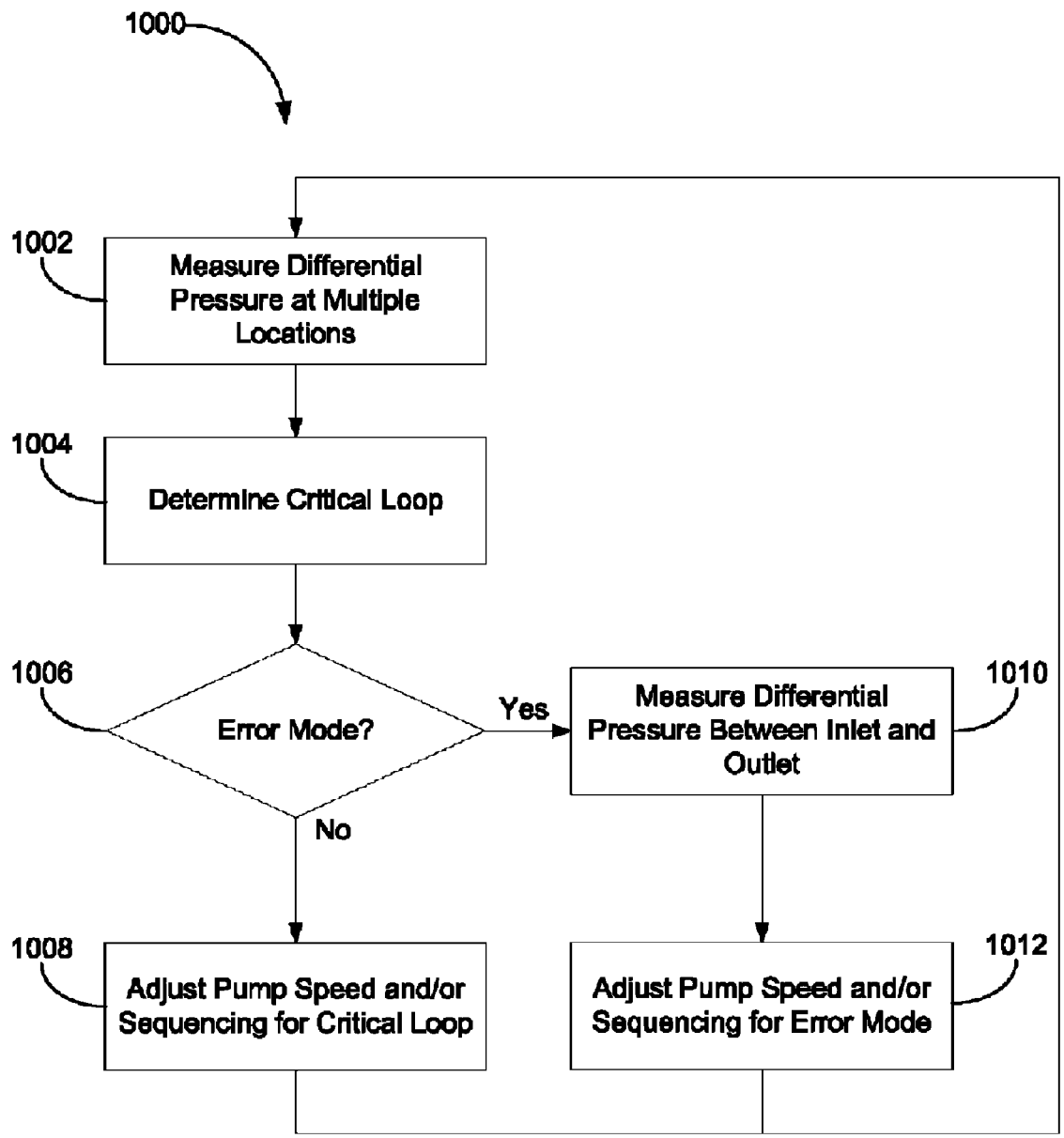
FIG. 1B is a process flow diagram of an algorithm executed by the pump controller of FIG. 1, according to an exemplary embodiment.

Referring now to FIG. 1B, and with reference to FIG. 1A, a process flow diagram 1000 illustrates a control algorithm that may be executed by pump controller 110 according to an exemplary embodiment. Pump controller 110 measures a differential pressure at multiple locations, for example at each loop 102 (step 1002). Based on the measured pressures, pump controller 110 determines the "critical loop" or the loop 102 with the pressure farthest from a corresponding setpoint (step 1004). A determination is made whether or not refrigeration system 100 is in an error mode in which local differential pressure measurements are used rather than "critical loop" measurements (step 1006). For example, refrigeration system 100 may be in a failsafe mode or a bypass mode (described herein with reference to FIG. 2). The determination regarding whether the system is in an error mode can include checking for alarms, alerts, or unexpected behavior regarding any one or more components of the system. If system 100 is not in an error mode, pump controller 110 adjusts the speed of one or more pumps 106 and/or sequences one or more pumps 106 into an "on" or "off" state based on the "critical loop" identification and measurements (step 1008) and returns to step 1002. If system 100 is in an error mode, pump controller 110 measures the differential pressure between an inlet and outlet to determine a local differential pressure (step 1010). Pump controller 110 adjusts the speed of one or more pumps 106 and/or sequences one or more pumps 106 into an "on" or "off" state based on the local measurements (step 1012) and returns to step 1002.

Figure 2:
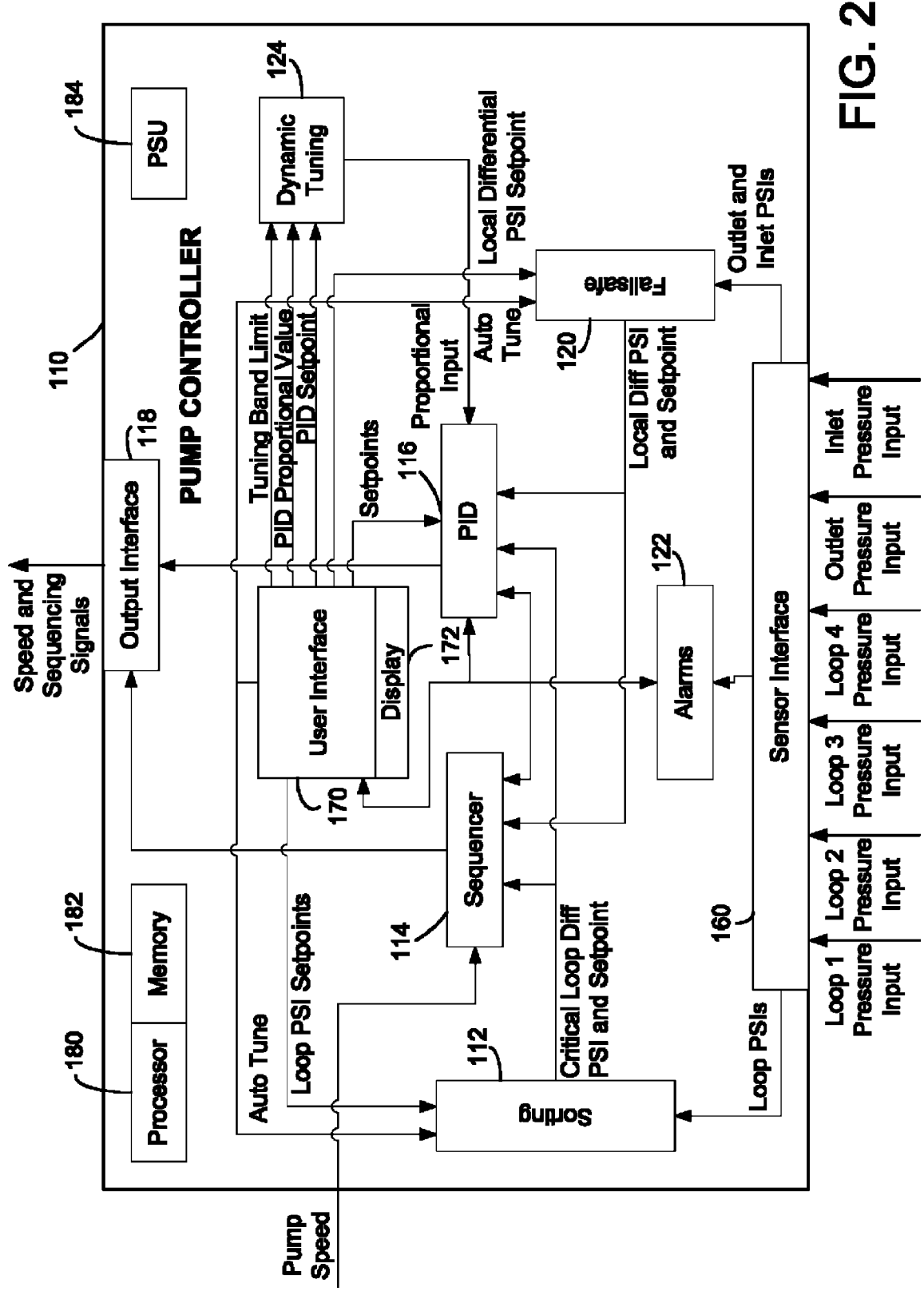
FIG. 2 is a more detailed block diagram of the pump controller shown in FIG. 1, according to an exemplary embodiment.

Referring to FIG. 2, a more detailed block diagram of pump controller 110 is illustrated, according to an exemplary embodiment. Pump controller 110 includes sorting module 112, sequencer 114, PID controller 116, output interface 118, failsafe module 120, sensor interface 160, and user interface 170, as illustrated in the exemplary embodiment of FIG. 1A, as well as an alarm module 122, a dynamic tuning module 124, a display 172, a processor 180, a memory 182, and a power supply unit (PSU) 184.

Pump controller 110 may operate according to a plurality of modes. The mode may be selectable by a user via user interface 170. In some embodiments, pump controller 110 may be configured to operate in either a sorting mode, using sorting module 112, or an averaging mode. For example, in averaging mode, pump controller 110 may be configured to communicate an average of loop pressure errors for loops 102 to sequencer 114 and PID controller 116. Loop pressure errors are the difference between the loop pressure inputs and their corresponding loop pressure setpoints. In averaging mode, sequencer 114 and PID controller 116 are configured to sequence pumps 106 and determine a corrective speed based upon the average loop error rather than the critical loop pressure and setpoint. In other embodiments, sorting module 112 may be configured to operate in a dual sorting/averaging mode, under which the sequence of pumps 106 and corrective speed are determined according to both the critical loop and the average loop error. Under the dual sorting/averaging mode, a relative weight may be given to the sorting and averaging modes to determine how much impact each mode will have in sequencing pumps 106 and determining the corrective speed. For example, the sorting portion of the dual mode may be given an eighty percent weight and the averaging portion a twenty percent weight, such that the sequencing of pumps 106 and the corrective speed are determined according to a function based eighty percent on the critical loop error and twenty percent on the average loop error. This relative weight may be selectable by a user via user interface 170, automatically determined using sensed conditions, or otherwise.

In some embodiments, pump controller 110 may be configured to operate in a flow sequencing mode, in which sequencer 114 may sequence pumps 106 on and/or off according to a flow rate information. In flow sequencing mode, sequencer 114 substitutes flow rate information obtained from one or more flow rate sensors located on system 101 for pressure information in determining pump sequencing signals for pumps 106. In such an embodiment, sequencer 114 compares the flow rate with one or more pump flow setpoints to determine if pumps 106 should be sequenced "on" or "off". In some embodiments, a flow sequencing mode may also be used if pump controller 110 is in bypass mode. Sequencer 114 may be configured to determine that the pump should be sequenced "on" if the flow rate is above a pump flow setpoint and the controller determines that the additional flow cannot be achieved in a speed increase in one or more of the variable speed pumps.

In some embodiments, pump controller 110 may be configured to operate in one or more error modes. In the event of a loop 102 failure (e.g., indicated by a loop failure alarm signal from an alarm module 122), pump controller 110 may operate in a failsafe mode in which a local differential pressure and setpoint are used in lieu of the "critical loop" information for determining a corrective speed. In the event of a VFD 108 failure (e.g., indicated by a VFD alarm signal from alarm module 122), pump controller 110 may enter a bypass mode where the critical loop and/or corrective speed are ignored and pumps 106 are sequenced on and/or off based on the local differential pressure and setpoint values. The bypass mode may be used if all VFDs 108 are disabled or at least one VFD 108 is disabled and all pumps 106 are running. If the inlet pressure drops beneath a certain point, pump controller 110 may enter a charge mode. In charge mode, all pumps but one "charge" pump may be disabled and the "charge" pump may be used to allow the fluid system to be charged with additional fluid. Pump controller 110 may also enter an unoccupied mode. In unoccupied mode, only one pump may be allowed to run and that pump may be limited to a reduced speed to keep liquid flowing through system 101 when system 101 is not in normal use. Any of these or other modes may be activated according to a pre-defined schedule, by instructions stored in memory 182, or manually by a user via user interface 170.

Failsafe module 120 may be configured to provide local differential pressure and setpoint signals to sequencer 114 and PID controller 116. The local differential pressure is the difference between the discharge pressure at the outlet of pumps 106 as measured by outlet pressure sensor 152 and the suction pressure at the inlet of pumps 106 as measured by inlet pressure sensor 154. In other words, local differential pressure is not indicative of the pressure in any specific secondary fluid. Sensor interface 160 receives the outlet and inlet pressures from sensors 152 and 154, respectively. Failsafe module 120 receives the outlet and inlet pressure inputs from sensor interface 160. Failsafe module 120 also receives a local differential pressure setpoint. The local differential pressure setpoint may be manually set by a user via user interface 170 or obtained from memory 182. The local differential setpoint may also be automatically determined by an automatic tuning feature signaled by the automatic tuning input. In some embodiments, failsafe module 120 may be configured to provide a local differential pressure error signal to sequencer 114 and PID controller 116, where the local differential pressure error is the difference between the local differential pressure and the local differential pressure setpoint.

Alarm module 122 is configured to determine a plurality of alarm conditions and communicate the alarm conditions to other modules of pump controller 110. Alarm module 122 may receive pressure inputs from sensor interface 160 related to at least some of the plurality of alarm conditions. The plurality of alarm conditions may include one or more error modes. If sensor interface 160 does not receive a valid loop pressure input from any loop 102 while that loop is active, alarm module 122 may activate a loop failure alarm causing pump controller 110 to enter into the failsafe mode. If all VFDs 108 are disabled or at least one VFD 108 is disabled and all pumps 106 are running, alarm module 122 may activate a VFD failure alarm causing pump controller 110 to enter into bypass mode. In bypass mode, corrective speed is ignored and pumps 106 are sequenced according to the local differential pressure instead of the "critical loop" differential pressure. In various exemplary embodiments, alarm module 122 may activate alarms related to various conditions of refrigeration system 100, such as power failure or irregularity, failure of inputs, low inlet pressure, high discharge pressure, failure or disablement of one or more pumps 106, and/or disablement of one or more VFDs 108. Alarm module 122 may also activate alarms regarding service notifications of various components of refrigeration system 100, such as notifications regarding a need to service pumps 106 and/or VFDs 108. Alarm module 122 may be further configured to activate alarms related to certain performance characteristics of refrigeration system 100, such as pressure characteristics and pump and/or VFD runtime and downtime. Alarm module 122 may interact with other modules of pump controller 110. In one exemplary embodiment, alarm module 122 may communicate alarm information to user interface 170, and a user may be permitted to manually activate, cancel, ignore, or respond to alarms via user interface 170, which may communicate such actions back to alarm module 122. In another exemplary embodiment, alarm module 122 may be configured to store alarm information in memory 182.

User interface 170 is generally configured to provide information about refrigeration system 100 to users and allow users to provide input to refrigeration system 100. User interface 170 may include one or more user devices (e.g., keyboards, pointing devices, displays, indicators, lights, LEDs, buttons, switches, touchpads, etc.) configured to display output to the user and/or to receive user input for use by pump controller 110. In some exemplary embodiments user interface 170 may be proximally located near pump controller 110. In other exemplary embodiments, user interface 170 may be located remote from pump controller 110 and communicate with pump controller 110 via a wired or wireless network (e.g., LAN, WAN, Internet, etc.). User interface 170 interacts with other modules of pump controller 110 to perform various functions. User interface 170 may receive information regarding pressure or other inputs from sensor interface 160. User interface 170 may receive alarm information from alarm module 122, and may be further configured to allow a user to respond to an alarm and communicate the response back to alarm module 122. User interface 170 may allow a user to set a plurality of setpoints, including, for example, loop pressure setpoints to communicate to sorting module 112, local differential pressure setpoints for failsafe module 120, PID setpoints to communicate to PID controller 116 and dynamic tuning module 124, and a tuning band limit and PID proportional value to communicate to dynamic tuning module 124. User interface 170 may also allow a user to actuate an automatic tuning input to activate an automatic tuning function. User interface 170 may also communicate with memory 182 to store and/or load information such as performance or alarm information regarding refrigeration system 100. User interface 170 may also be configured to communicate with output interface 118 to allow a user to manipulate different components of refrigeration system 100 such as pumps 106 and VFDs 108. User interface 170 may be configured to permit different levels of access based on different characteristics of a user. For example, user interface 170 may have operator, system setup, and factory setup levels of access. Different levels of access may be protected by any user access limitation method, such as passcodes, keycards, biometric devices, etc.

Display 172 is generally configured to provide information regarding refrigeration system 100 to a user. Display 172 may be any type of display (e.g., OLED, dot-matrix, LCD, LED-based, CRT-based, plasma-based, etc.). Display 172 can be configured to display numbers, letters, symbols, graphics, and/or any other indicia that can be interpreted by a user. Display 172 may be configured to display, for example, alarm information received from alarm module 122, pressure input information received from sensor interface 160, refrigeration system 100 performance information received from memory 182, or any other information regarding refrigeration system 100.

According to the exemplary embodiment of FIG. 2, pump controller 110 may be implemented as or include a processing circuit including a processor 180 and a memory 182. The processing circuit can be a processing board communicably connected to a main PCB for pump controller 110, can be surface mounted to a main PCB for pump controller 110, or otherwise operably connected to pump controller 110. The processing circuit can be distributed throughout pump controller 110, can be a separate board or boards, can be one more integrated circuits and associated circuitry, or can have any other configuration. Processor 180 can be one or more general or special purpose processors configured to conduct, execute and/or facilitate the processes and activities described herein. For example, the processor can be a general purpose processor configured to execute computer code stored on memory 182 or otherwise for facilitating the activities described in the present application. In some exemplary embodiments, modules 112, 114, and 116 and/or other modules in size may be software modules, (e.g., computer code, object code, executable code, script code, etc.). In other exemplary embodiments modules 112, 114, and 116 may be hardware circuits (e.g., having one or more integrated circuits (ICs) that may utilize computer code stored in memory or otherwise). In another exemplary embodiment, processor 180 may be a special purpose processor such as a FPGA (field programmable gate array) or an ASIC (application-specific integrated circuit). Memory 182 can be a single memory device, multiple memory devices, volatile memory, non-volatile memory, or any such suitable memory system configured to store or retrieve stored computer code, temporary information, or other data. In some exemplary embodiments memory 182 may comprise RAM, ROM, EPROM, EEPROM, flash memory, CD-ROM, DVD-ROM or other optical disc storage, magnetic disk storage or other magnetic storage devices, etc.

According to the exemplary embodiment of FIG. 2, pump controller 110 is further shown to include a power supply unit (PSU) 184. PSU 184 may be configured to receive power (AC power or DC power) from a main power supply for refrigeration system 100 or from another power source.

Figure 3A:
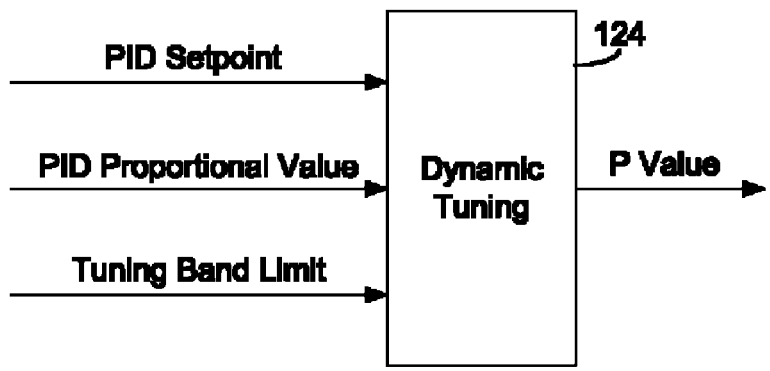
FIG. 3A is a more detailed block diagram of the dynamic tuning module of the pump controller shown in FIGS. 1 and 2, according to an exemplary embodiment.
Figure 3B:
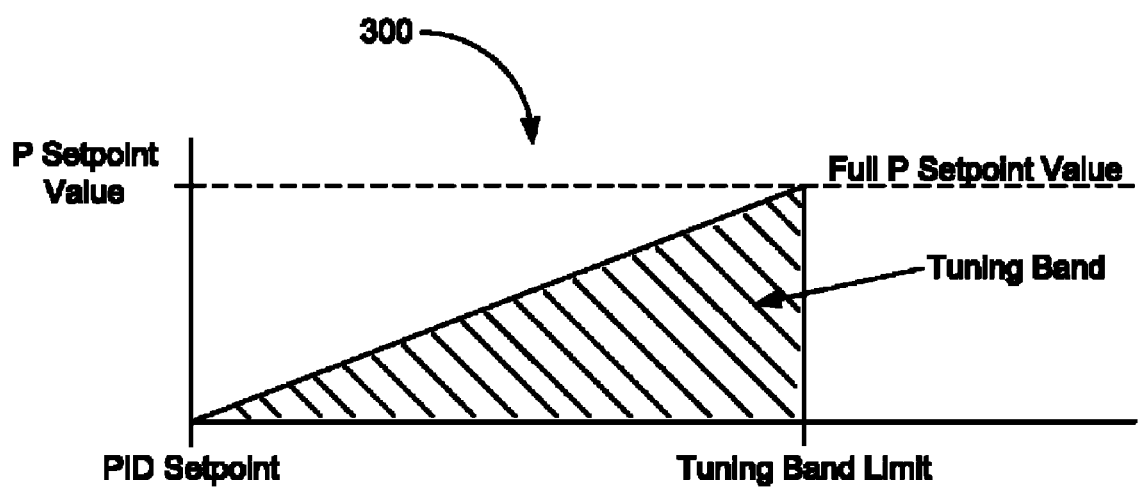
FIG. 3B is a graph illustrating proportional values that may be adjusted by the dynamic tuning module shown in FIG. 3A, according to an exemplary embodiment.

Referring to FIGS. 3A and 3B, dynamic tuning module 124, illustrated in the exemplary embodiment of FIG. 2, is described, according to an exemplary embodiment. Dynamic tuning module 124 is configured to provide a tuning input to PID controller 116 used in relation to the PID analysis to determine a corrective speed to reduce the pressure error of the critical loop. Dynamic tuning module 124 receives a PID setpoint, a PID proportional value or proportional (P) setpoint value, and a tuning band limit as inputs and determines a dynamically adjusted proportional value (a P value) to be output to PID controller 116. The inputs may be manually entered by a user via user interface 170, predefined and stored in memory 182, or automatically calculated based on system parameters. The P value is calculated by dividing the proportional setpoint value by the difference between the tuning band (the sum of the tuning band limit and the PID setpoint) and the position within the tuning band (e.g., the actual pressure):

$$P\text{Value} = P\text{Setpoint}/|(PID \text{ Setpoint} \pm \text{Tuning Band Limit}) - \text{Actual Pressure}|$$

The tuning band limit is added if the actual pressure is higher than the PID setpoint and the tuning band limit is subtracted if the actual pressure is lower than the PID setpoint. If |(PID Setpoint±Tuning Band Limit)−Actual Pressure| is equal to zero, then the P value is set equal to the P setpoint. For example, if the P setpoint value is equal to 1000, the tuning band limit is set at 10 PSI, the PID setpoint is set at 100 PSI, and the actual pressure is 105 PSI, the resulting P value is 200. If the actual pressure is changed to 98 PSI, the P value changes to 125. Once the P value has been calculated, dynamic tuning module 124 outputs the P value to PID controller 116 for use in determining the PID analysis to be applied based on the pressure error of the critical loop to determine a corrective speed.

As shown in a graph 300, the tuning band is a function of the PID setpoint, the tuning band limit, and the proportional setpoint value. The tuning band may be an integrated area between a horizontal line from the PID setpoint to the tuning band limit underneath a vertical value representing the proportional setpoint value.

Figure 4:
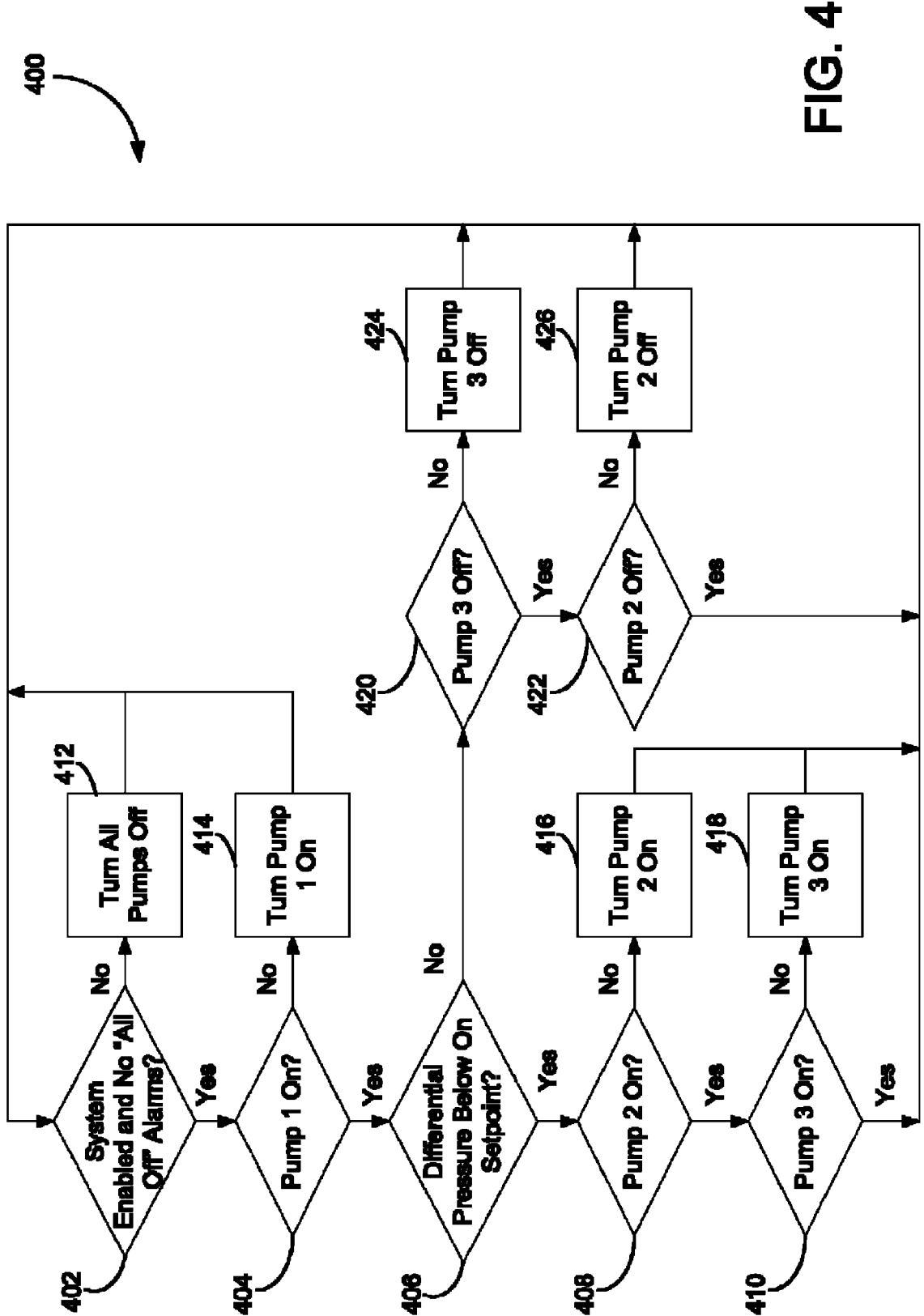
FIG. 4 is a process flow diagram of a sequencing algorithm executed by the pump controller of FIGS. 1 and 2, according to an exemplary embodiment.

Referring to FIG. 4, a process flow diagram 400 illustrates a control algorithm that may be executed by pump controller 110 to sequence pumps 106 to reduce the pressure error of the critical loop, according to an exemplary embodiment. Pump controller 110 determines whether refrigeration system 100 is enabled and there are no "all off" alarms indicating that all components of system 100 should remain off (step 402). If system 100 is disabled or there are any "all off" alarms enabled, pump controller 100 sequences all pumps 106 to the "off" state (step 412) and returns to step 402. If system 100 is enabled and there are no "all off" alarms enabled, pump controller 110 determines whether the first pump is in the "on" state (step 404). If the first pump is in the "off" state, pump controller 110 sequences the first pump to the "on" state (step 414) and returns to step 402.

If the first pump is in the "on" state, pump controller 110 determines whether the pressure of the critical loop (or local differential pressure, if pump controller 110 is in an error mode) is below a pressure setpoint (step 406). If the differential pressure is below the pressure setpoint, pump controller 110 determines whether the second pump is in the "on" state (step 408). If the second pump is in the "off" state, pump controller 110 sequences the second pump to the "on" state (step 416) and returns to step 402. If the second pump is in the "on" state, pump controller 110 determines whether the third pump is in the "on" state (step 410). If the third pump is in the "off" state, pump controller 110 sequences the third pump to the "on" state (step 418) and returns to step 402. If the third pump is in the "on" state, pump controller 110 returns to step 402.

If the differential pressure of the critical loop (or the local differential pressure, if pump controller 110 is in an error mode) is at or above the pressure setpoint, pump controller 110 determines whether the third pump is in the "off" state (step 420). If the third pump is in the "on" state, pump controller 110 sequences the third pump to the "off" state (step 424) and returns to step 402. If the third pump is in the "off" state, pump controller 110 determines whether the second pump is in the "off" state (step 422). If the second pump is in the "on" state, pump controller 110 sequences the second pump to the "off" state (step 426) and returns to step 402. If the second pump is in the "off" state, pump controller 110 returns to step 402.

The control algorithm illustrated by the exemplary process flow diagram of FIG. 4 may, in some embodiments, include further control conditions. For example, pump controller 110 may be configured to sequence a pump to the "on" state only if the corresponding VFD is running above a minimum "pump on" speed and/or only after a certain time delay. Similarly, pump controller 110 may be configured to sequence a pump to the "off" state only if the corresponding VFD is running below a maximum "pump off" speed and/or only after a certain time delay.

It is important to note that the construction and arrangement of the elements of the refrigeration system are illustrative only. Although only a few exemplary embodiments of the present disclosure have been described in detail in this disclosure, those skilled in the art who review this disclosure will readily appreciate that many modifications are possible in these embodiments (such as variations in features such as components, formulations of coolant compositions, heat sources, orientation and configuration of the cooling elements, the location of components and sensors of the cooling system and control system; variations in sizes, structures, shapes, dimensions and proportions of the components of the system, use of materials, colors, combinations of shapes, etc.) without materially departing from the novel teachings and advantages of the disclosure. For example, closed or open space refrigeration devices may be used having either horizontal or vertical access openings, and cooling elements may be provided in any number, size, orientation and arrangement to suit a particular refrigeration system; the system may include a variable speed fan, under the control of the pump control system. Setpoints for the control system may be determined empirically or predetermined based on operating assumptions relating to the intended use or application of the refrigeration devices. According to other alternative embodiments, the refrigeration system may be any device using a refrigerant or coolant, or a combination of a refrigerant and a coolant, for transferring heat from one space to be cooled to another space or source designed to receive the rejected heat and may include commercial, institutional or residential refrigeration systems. Further, it is readily apparent that variations of the refrigeration system and its components and elements may be provided in a wide variety of types, shapes, sizes and performance characteristics, or provided in locations external or partially external to the refrigeration system. Accordingly, all such modifications are intended to be within the scope of the disclosure.

The order or sequence of any process or method steps may be varied or re-sequenced according to alternative embodiments. Other substitutions, modifications, changes and omissions may be made in the design, operating configuration and arrangement of the preferred and other exemplary embodiments without departing from the spirit of the disclosure.

What is claimed is:

1. A secondary coolant refrigeration system comprising:
    one or more pumps configured to pump secondary coolant fluid through a plurality of secondary coolant fluid loops, wherein at least one of the one or more pumps is a variable speed pump; and
    a controller configured to receive loop pressure inputs from pressure sensors associated with each of the plurality of secondary coolant fluid loops via a sensor interface, wherein the controller is further configured to use the received loop pressure inputs to identify a critical loop by determining a secondary coolant fluid loop of the plurality of secondary coolant fluid loops having a loop pressure input furthest from a loop pressure setpoint, wherein the controller is further configured to determine a corrective speed based on the loop pressure input associated with the critical loop and to output a pump speed signal for adjusting a speed of the at least one variable speed pump based on the determined corrective speed.

2. The secondary coolant refrigeration system of claim 1, wherein the controller is further configured to output a pump sequencing signal for causing one of the one or more pumps to enter into an on state or an off state based on the loop pressure input associated with the critical loop.

3. The secondary coolant refrigeration system of claim 2, wherein the controller is further configured to operate according to a plurality of operating modes.

4. The secondary coolant refrigeration system of claim 3, wherein one of the plurality of operating modes is a failure mode, wherein, when the controller is operating in failure mode, the controller is configured to determine at least one of the corrective speed and the one or more pump sequencing signals according to a local differential pressure and a local differential pressure setpoint, wherein the local differential pressure is the difference between an outlet pressure input and an inlet pressure input, wherein the outlet pressure input is received from a pressure sensor located at an outlet of the one or more pumps via the sensor interface, wherein the inlet pressure input is received from a pressure sensor located at an inlet of the one or more pumps via the sensor interface.

5. The secondary coolant refrigeration system of claim 1, further comprising one or more variable frequency drives configured to control the speed of the at least one variable speed pump by providing variable frequency power to the at least one variable speed pump.

6. The secondary coolant refrigeration system of claim 1, wherein the sensor interface receives the loop pressure inputs from differential pressure sensors associated with the plurality of secondary coolant fluid loops.

7. The secondary coolant refrigeration system of claim 1, wherein the controller comprises a programmable controller.

8. The secondary coolant refrigeration system of claim 1, wherein the controller comprises a proportional-integral-derivative circuit configured to determine the corrective speed.

9. The secondary coolant refrigeration system of claim 8, wherein the controller further comprises a dynamic tuning module configured to dynamically adjust a proportional input of the proportional-integral-derivative circuit.

10. The secondary coolant refrigeration system of claim 1, wherein the corrective speed is determined according to a function of both the loop pressure input associated with the critical loop and an average of loop pressure errors, wherein the loop pressure errors are the difference between the loop pressure inputs and the loop pressure setpoints, wherein a relative weight placed on the loop pressure input associated with the critical loop and the average of loop pressure errors can be varied.

11. The secondary coolant refrigeration system of claim 1, wherein the controller further comprises a user interface, wherein the user interface permits a user to alter one or more controller parameters, wherein the controller parameters include one or more pressure setpoints.

12. The secondary coolant refrigeration system of claim 1, wherein the controller further comprises an automatic tuning function, wherein the automatic tuning function tunes one or more controller parameters according to hydraulic characteristics of the secondary coolant refrigeration system, wherein the controller parameters include one or more pressure setpoints.

13. The secondary coolant refrigeration system of claim 1, wherein the loop pressure setpoint is the same for each of the secondary coolant fluid loops.

14. The secondary coolant refrigeration system of claim 1, wherein the loop pressure setpoint varies for each secondary coolant fluid loop, wherein the controller is configured to identify the critical loop by determining a secondary coolant fluid loop of the plurality of secondary coolant fluid loops having a loop pressure input furthest from the loop pressure setpoint associated with that secondary coolant fluid loop.

15. A method for controlling one or more pumps used in a secondary coolant refrigeration system, at least one of the one or more pumps being a variable speed pump, the secondary coolant refrigeration system comprising a plurality of secondary coolant fluid loops, the method comprising:
measuring loop pressures associated with each of the plurality of secondary coolant fluid loops;
sorting the loop pressures to identify a loop pressure of the measured loop pressures furthest from a loop pressure setpoint; and
adjusting the speed of the at least one variable speed pump based on the loop pressure furthest from the loop pressure setpoint.

16. The method of claim 15, further comprising:
sequencing one of the one or more pumps to an on state or an off state based on the loop pressure furthest from the loop pressure setpoint.

17. The method of claim 15, further comprising:
setting the loop pressure setpoint based at least in part on hydraulic characteristics of the secondary coolant refrigeration system according to an automatic tuning function.

18. The method of claim 15, wherein the loop pressure setpoint varies for each secondary coolant fluid loop, wherein sorting comprises comparing each loop pressure to its associated setpoint.

19. A controller configured to control one or more pumps of a secondary coolant refrigeration system, wherein at least one of the one or more pumps is a variable speed pump, the one or more pumps being configured to pump secondary coolant fluid through a plurality of secondary coolant fluid loops, the controller comprising:
a sorting module configured to receive loop pressure inputs from pressure sensors associated with the plurality of secondary coolant fluid loops via a sensor interface, wherein the sorting module is further configured to use the received loop pressure inputs to identify a critical loop by determining a secondary coolant fluid loop of the plurality of secondary coolant fluid loops with a loop pressure input furthest from a loop pressure setpoint; and
a speed module configured to determine a corrective speed based on the loop pressure input associated with the critical loop and to output a pump speed signal for adjusting a speed of the at least one variable speed pump based on the determined corrective speed.

20. The controller of claim 19, further comprising a sequencing circuit configured to output a pump sequencing signal for causing one of the one or more pumps to enter into an on state or an off state based on the loop pressure input associated with the critical loop.

21. The controller of claim 19, wherein the speed circuit is configured to determine the corrective speed according to a function of both the loop pressure input associated with the critical loop and an average of loop pressure errors, wherein the loop pressure errors are the difference between the loop pressure inputs and the loop pressure setpoints, wherein a relative weight placed on the loop pressure input associated with the critical loop and the average of loop pressure errors can be varied.

* * * * *